United States Patent [19]

Hata et al.

[11] 4,103,486

[45] Aug. 1, 1978

[54] METHOD OF CONTROLLING TEMPERATURE IN THERMAL REACTOR FOR ENGINE EXHAUST GAS AND IGNITION SYSTEM FOR PERFORMING SAME

[75] Inventors: Yoshitaka Hata, Fujisawa; Kenji Masaki; Kenji Ikeura, both of Yokohama, all of Japan

[73] Assignee: Nissan Motor Company, Ltd., Japan

[21] Appl. No.: 673,536

[22] Filed: Apr. 5, 1976

Related U.S. Application Data

[62] Division of Ser. No. 554,494, Mar. 3, 1975, abandoned.

[30] Foreign Application Priority Data

Apr. 15, 1974 [JP] Japan .................................. 49/41911

[51] Int. Cl.² .............................................. F02B 75/10
[52] U.S. Cl. ...................................... 60/274; 60/284; 60/285
[58] Field of Search .......................... 60/284, 285, 274

[56] References Cited

U.S. PATENT DOCUMENTS

| 2,937,490 | 5/1960 | Calvert | 60/284 |
| 3,896,913 | 7/1975 | Maruoka | 60/285 |
| 4,023,359 | 5/1977 | Masaki | 60/285 |

FOREIGN PATENT DOCUMENTS 2,133,996  1/1973  Fed. Rep. of Germany ............ 60/285

*Primary Examiner*—Douglas Hart

[57] ABSTRACT

In a spark-ignited internal combustion engine having a plurality of combustion chambers, at least one combustion chamber is intentionally caused to misfire either periodically or continuously to increase the amount of unburned fuel in the exhaust gas when the temperature in the thermal reactor drops excessively during, e.g., idling of the engine. An ignition system for performing the method has a supplementary ignition primary circuit which is normally disconnected from the ignition coil primary, but causes the secondary voltage either to become zero periodically or to lower when connected with the ignition coil primary. Alternatively, the ignition timing is retarded from a normal timing in a portion of the combustion chambers to raise the exhaust gas temperature. An ignition system for the ignition timing retardation has a supplementary circuit which prevents certain times of the breaks in the primary circuit from producing sparks in the intended combustion chambers and supplies a high voltage pulse to each of these combustion chambers with a predetermined time delay from each of the breaks which are made ineffectual.

3 Claims, 6 Drawing Figures

METHOD OF CONTROLLING TEMPERATURE IN THERMAL REACTOR FOR ENGINE EXHAUST GAS AND IGNITION SYSTEM FOR PERFORMING SAME

This is a division of application Ser. No. 554,494, filed Mar. 3, 1975, now abandoned.

The present invention relates generally to a method of controlling the temperature in a thermal reactor attached to an internal combustion engine for causing the exhaust gas to react completely with air, and more particularly to a method of preventing an excessive drop of the reactor temperature when the engine is idling or running under a relatively light load and a system for performing the same with respect to the engine of a type having a plurality of combustion chambers.

Many of current internal combustion engines including automotive engines are provided with thermal reactors to convert harmful substances contained in the exhaust gas such as unburned fuel or hydrocarbons and carbon monoxide into harmless substances before emission into the atmosphere. As is known, oxidation or burning reactions in a thermal reactor proceed more easily as the exhaust gas temperature increases. In general the hydrocarbons and carbon monoxide in an engine exhaust gas can be burned with ease in a thermal reactor at temperature above the so-called "trigger temperature", which is about 600° C.

The exhaust gas temperature is usually high enough to allow the reactions in the thermal reactor to proceed stably when the engine is running under relatively heavy loads and/or at relatively high speeds, but decreases to such an extent that the reactions cannot be completed, or even do not occur in an extreme case, when the engine is idling or running under relatively light loads and/or at relatively low speeds. It is quite undesirable that the concentrations of hydrocarbons and/or carbon monoxide in the exhaust gas exceed permissible levels even only when the engine runs under such particular conditions. In a known method for solving this problem a fuel-enriched combustible mixture is fed to the engine when the exhaust gas temperature drops below the "trigger temperature" in order to cause the carbon monoxide concentration in the exhaust gas to increase since the reactions in a thermal reactor is intensified when the carbon monoxide concentration in the exhaust gas is comparatively high within reasonable limits. Alternatively, the ignition timing of the engine is retarded intentionally from a normal timing when the engine is running under the above described conditions in order to increase the exhaust gas temperature. These conventional methods, however, have a common disadvantage that the fuel consumption of the engine is inevitably caused to increase noticeably.

It is therefore an object of the present invention to provide a method of raising the temperature in a thermal reactor which is incorporated in an exhaust system of a spark-ignited internal combustion engine having a plurality of combustion chambers, which occupies a great majority of current engines, when the temperature falls below a predetermined temperature, e.g., when the engine is idling or running under a relatively light load and/or at a relatively low speed, which method causes less increase in the fuel consumption than the increase caused by conventional methods.

It is another object of the invention to provide a system for putting such a method into practice.

The present invention is concerned with a sparkignited internal combustion engine which has a plurality of engine cylinders or combustion chambers and is equipped with a thermal reactor.

According to one aspect of the invention, at least one of the combustion chambers is caused to misfire at least occasionally thereby to increase the amount of unburned fuel in the exhaust gas discharged from the combustion chamber when the temperature in the thermal reactor falls below a predetermined temperature.

According to another aspect of the invention, the ignition timing of the engine is retarded from a normal timing in a portion of total firings in all the combustion chambers during a predetermined period of time thereby to raise the temperature of the exhaust gas when the temperature in the thermal reactor falls below a predetermined temperature. The retardation of the ignition timing is performed in at least one combustion chamber.

The present invention provides also an ignition system for performing such a method. For the former aspect of the method, a conventional ignition system, which has an ignition coil, a means to break periodically a primary ignition circuit including a primary winding of the coil and an ignition distributor capable of connecting a secondary winding of the coil by turns to each of spark plugs of all the combustion chambers to impress a secondary high voltage on each spark plug, is provided with a set of supplementary elements in combination. This set comprises a temperature sensor for sensing the temperature in the thermal reactor and producing an electric signal representing the sensed temperature, and means to lower the secondary voltage periodically to such a predetermined voltage, which is inclusive of zero, that the spark plugs are caused to fail in producing sparks of a normal intensity high enough to fire the combustion chambers when the temperature represented by the electric signal is below the predetermined temperature.

For the latter aspect of the method, the same conventional ignition system is provided with a separate set of elements in combination. This set of elements comprises the same temperature sensor, and means to prevent a portion of the periodic breaks in the primary ignition circuit from causing the intended spark plugs to produce sparks and supply a high voltage pulse to each of these spark plugs with a predetermined time delay from each of the breaks made ineffectual in accordance with the firing sequence of the engine when the temperature represented by the electric signal is below the predetermined temperature.

The increase in the fuel consumption in a method of the invention is far less than in conventional methods because only a portion of the total firings of the combustion chambers are caused either to result in misfirings or to occur at a retarded ignition timing in the former method while either the entire firings are performed at a retarded ignition timing or all the combustion chambers are fed with a rich mixture in the latter methods. Lowerings in the engine efficiencies caused by a method of the invention have little practical importance since the method is applied only when the engine idles or runs under a relatively light load and/or at a relatively low speed.

The invention will be fully understood from the following detailed description of the preferred embodiments thereof with reference to the accompanying drawings, in which.

Figure 1:
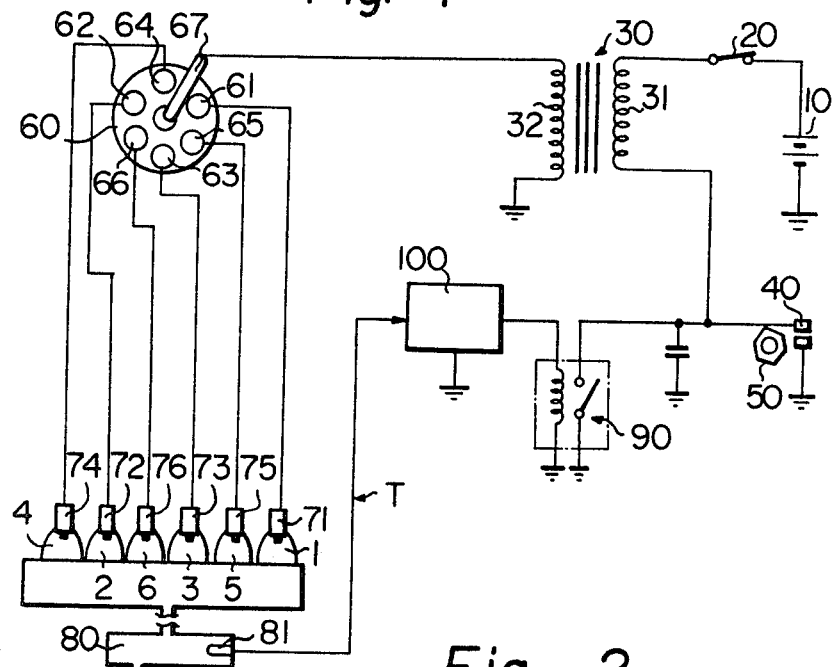
FIG. 1 is a diagram of a fundamental circuit of a system according to the invention for causing all the combustion chambers of a six-cylinder engine to misfire each periodically, which system has a set of elements for temporarily preventing the induction of the secondary voltage.

In a spark-ignited engine, the intentional misfiring of selected combustion chambers according to the invention can be realized by periodically preventing development of the secondary voltage in the secondary winding of an ignition coil even though breaker points in the primary ignition circuit are opened at normal intervals. For example, a switch is provided in the primary circuit in parallel with the breaker points and closed periodically for predetermined periods of time. The switch is preferably controlled by a conventional astable multivibrator to which a signal representing the temperature in a thermal reactor attached to the engine is supplied. Alternatively, the primary current through the ignition coil may by decreased periodically so that the secondary voltage may be lowered. The intentional misfiring according to the invention may be caused either only in specifically and preliminarily appointed combustion chambers or in all the combustion chambers. Continuous misfirings in all the combustion chambers of course result in stop of the engine. Accordingly, when the misfiring is intended to occur in all the combustion chambers, each combustion chamber is caused to misfire periodically and preferably in a indiscriminate order such that the misfiring occurs at a rate corresponding to about 10 to about 50% of the number of the actions of the breaker points during a certain period of time or certain times of engine revolutions. It is permissible that half the number of combustion chambers are caused each to misfire alternately with each of the remaining half in accordance with the firing sequence of the engine. This apportionment augments the increase in the fuel consumption, but allows the temperature recovery in the thermal reactor to be achieved quickly.

When the ignition timing is retarded in place of the above described intentional misfiring, from about 10 to about 50% of the total number of firings during a certain period of time are retarded from the normal or pre-set ignition timing while the remaining firings are performed normally. Half the number of the combustion chambers may be fired at a retarded ignition timing each alternately with each of the remaining half to achieve a quick temperature recovery in the thermal reactor. The ignition timing for predetermined combustion chambers can be retarded as follows. As a first step, distributor contacts in the secondary ignition circuit for the spark plugs of these combustion chambers are switched into separately provided circuits which are respectively in parallel with the respective spark plugs and terminates at spark gaps located out of the combustion chambers. With a predetermined time delay from each discharge across the spark gap, a high voltage pulse is supplied to one of the spark plugs which have been disconnected from the distributor contacts, in the order of the firing sequence of the engine, from a pulse generator independent of the ignition coil. When the ignition timing retardation is intended to occur at random in indiscriminate combustion chambers, the breaker points in the primary ignition circuit are switched intermittently into an additional set of breaker points, which are opened with a predetermined time delay from each break of the former breaker points. The switching is preferably accomplished electronically in response to an electric signal which varies depending on the thermal reactor temperature, but independent of the engine speed.

An ignition system of a six-cylinder engine (no numeral) shown in FIG. 1 is fundamentally a typical conventional system. A primary ignition circuit therein essentially consists of a DC power source 10, an ignition switch 20, a primary winding 31 of an ignition coil 30, and a set of breaker points 40 which is governed by a cam 50. A secondary circuit essentially consists of a secondary winding 32 of the ignition coil 30, an arm 67 of a distributor 60, a six terminals 61 – 66 of the distributor 60 and six spark plugs 71 – 76 for six combustion chambers 1 – 6 of the engine. The engine is equipped with a conventional thermal reactor 80 to burn hydrocarbons and carbon monoxide in the exhaust gas from the combustion chambers 1 – 6 before emission into the atmosphere. According to the invention, a normally open relay 90 is provided in the primary circuit in parallel with the breaker points 40, and the relay 90 is governed by a control unit 100. The control unit is connected with a temperature sensor 81 which is disposed in the thermal reactor 80.

In this system, the temperature sensor 81 transmits an electric signal T representing the temperature in the thermal reactor 80 to the control unit 100. The control unit 100 causes the relay 90 to close periodically, each time for a predetermined period of time, thereby to ground the primary winding 31 regardless of the action of the breaker points 40 when the temperature in the thermal reactor 80 falls below a predetermined temperature, which is around the "trigger temperature". It will be apparent that no secondary voltage is induced on the secondary winding 32 when the relay 90 is kept closed even though the breaker points 40 are opened. Consequently, any of the spark plugs, e.g. 71, which is ordinarily expected to produce a spark in response to the action of the breaker points 40 makes no action. Thus a misfiring occurs in the combustion chamber 1, and the combustible mixture in this combustion chamber 1 remains unburned and is discharged into the thermal reactor 80.

The control unit 100 has the function of producing an output, the voltage of which varies such that the relay 90 is kept closed for a predetermined period of time at predetermined intervals. Such function can be realized variously in the current field of electronics engineering. An example of the control unit 100 is illusrtrated in FIG. 2. This control unit 100 is a well known astable multivibrator, which is fundamentally constituted of two transistors 101 and 102, a base resistor 103 having a resistance R and coupling capacitors 104 and 105 respectively having capacitances $C_1$ and $C_2$. The temperature sensor 81 of FIG. 1 is preferably a thermistor having a varying resistance $R_t$, which varies with temperature and serves as another base resistor of the multivibrator 100. This multivibrator 100 is operated with a DC current and produces a square wave output.

The width $T_m$ of the square on the positive side is determined by $0.7 \times C_2 \times R_t$, while the other width $T_n$ on the negative side corresponds to $0.7 \times C_1 \times R$. The resistance R and the capacitances $C_1$ and $C_2$ remain constant, so that the pulse width or duration $T_m$ is directly proportional to the resistance $R_t$ of the thermistor 81. The resistance $R_t$ increases as the temperature T in the thermal reactor 80 decreases, and the resistance variation is logarithmic with a linear variation of the temperature by a factor of at least 10 per 150° C change in the latter. The width $T_m$, therefore, varies broadly as the temperature T varies, while the width $T_n$ remains unchanged. The relay 90 is arranged so as to close while the positive pulse $T_m$ is applied thereon. The negative pulse $T_n$ has a constant width, and both the width $T_n$ and one cycle of the square wave output of the multivibrator 100, which consists of $T_m + T_n$, do not depend on the engine speed. Consequently, the misfiring due to the action of the relay 90 occurs in all the cylinders 1 – 6 indiscriminately and by random turns.

Figure 2:
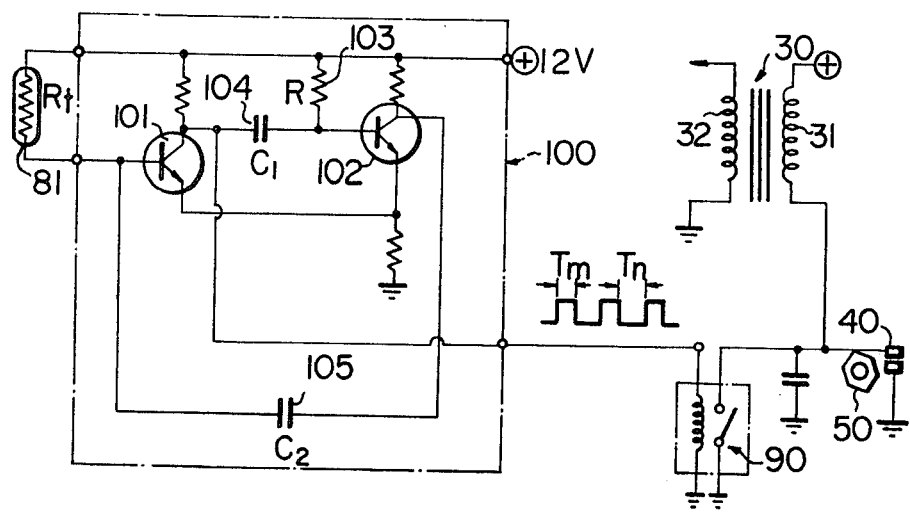
FIG. 2 is a circuit diagram of a conventional astable multivibrator incorporated in the system of FIG. 1.
Figure 3:
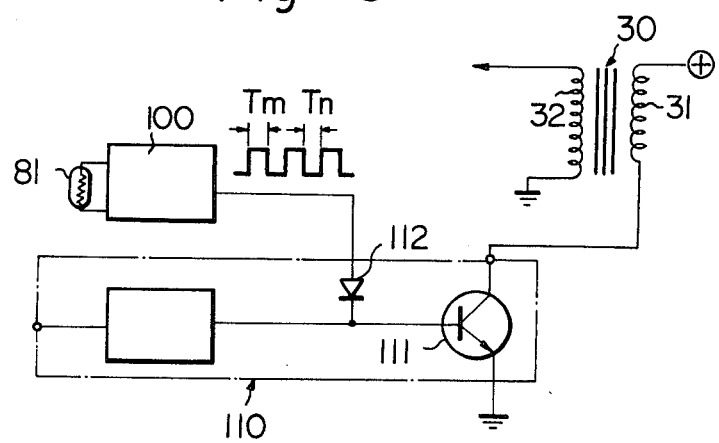
FIG. 3 is a block diagram of a system which is essentially similar to that of FIG. 1, but employs a transistor circuit in place of a set of breaker points in FIG. 1.

The multivibrator 100 of FIG. 2 is applicable also to a different type of conventional ignition system which employs a transistor circuit in place of the breaker points 40. In FIG. 3, the output or square wave $T_m + T_n$ of the multivibrator 100 is applied on the base of a power transistor 111, which serves as the final stage transistor of a fully transistorized contactless ignition circuit 110, through a diode 112. A base current is supplied to the power transistor 111 when the positive pulse $T_m$ is applied thereon even if the transistorized ignition circuit 110 acts to break the base current thereby to break the primary current through the ignition coil 30. As a result, a collector current or the primary ignition current continues to flow through the primary winding 31 of the ignition coil 30 and no secondary voltage is developed on the secondary winding 32.

Figure 4:
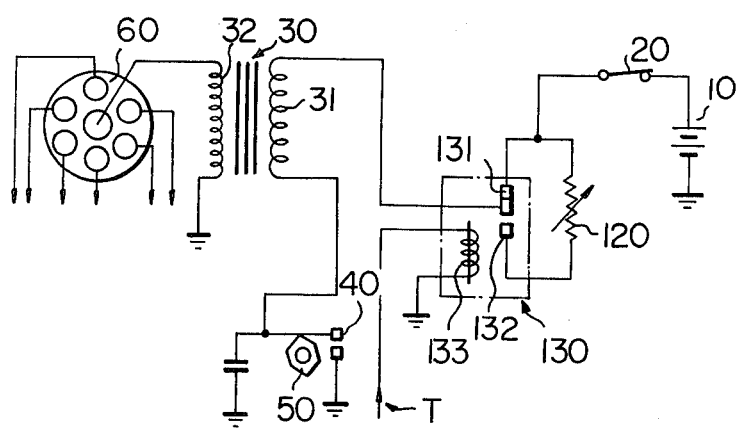
FIG. 4 is a diagram of a part of a fundamental circuit of a system for accomplishing the same misfiring as in the system of FIG. 1, which system has a set of elements for temporarily lowering the secondary voltage.

FIG. 4 illustrates another type of circuit for realizing the intentional misfiring according to the invention in an engine ignition system having the breaker points 40. A variable resistor 120 and a solenoid-operated switch 130 are provided in the primary circuit such that the switch 130 is normally turned to a first terminal 131 to disconnect the resistor 120 from the primary circuit, but turned to a second terminal 132 to connect the resistor 120 in series with the primary winding 31 of the ignition coil 30 when a solenoid 133 is energized. The solenoid 133 is energized by the signal T when the temperature in the thermal reactor 80 falls below a predetermined temperature around the "trigger temperature". When the resistor 120 is in connection wth the primary winding 31, the primary current decreases and the secondary voltage on the secondary winding 32 becomes low enough to cause occasional misfirings of the spark plugs 71 – 76. The proportion of the misfirings to the normal firings can be regulated by varying the resistance of the resistor 120. The multivibrator 100 of FIG. 2 may be used to control the solenoid 133 based on the signal T so that all the spark plugs 71 – 76 may misfire indiscriminately and by random turns. Alternatively, a separate ignition circuit having no means to cause the misfiring may be provided in parallel with the circuit of FIG. 4 in such an arrangement that half the number of the cylinder 1 – 6 (strictly speaking, the spark plugs 71 – 76) are connected to the former circuit and the remaining half to the latter. The apportionment of the cylinders 1 – 6 to the two circuits are such that each misfiring occurs alternately with a normal firing in accordance with the firing sequence of the engine.

Figure 5:
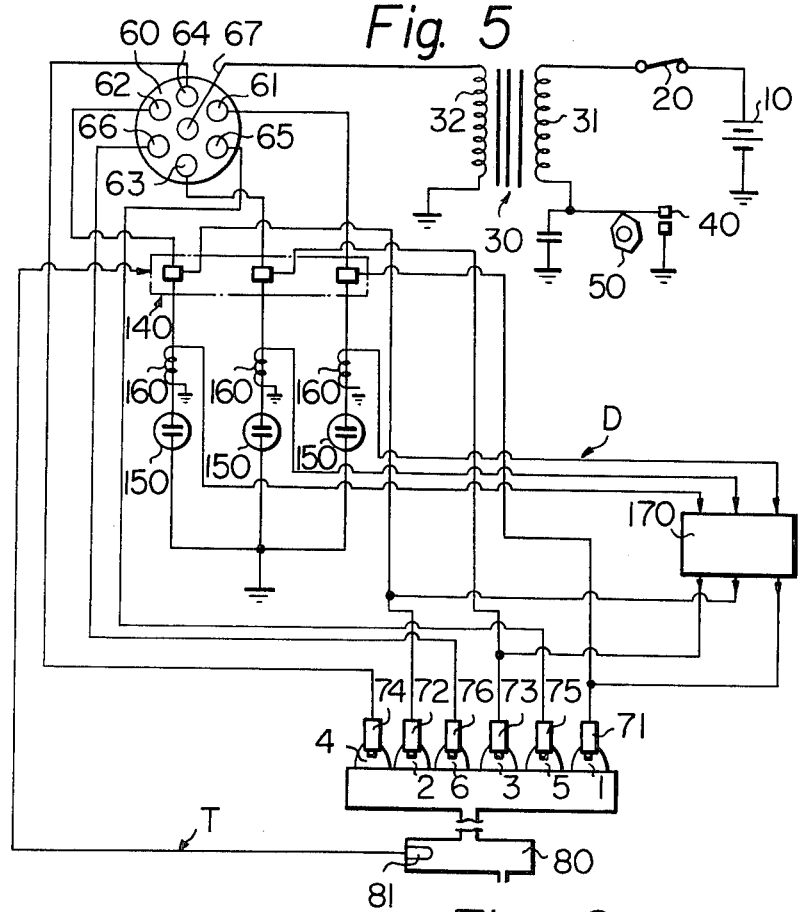
FIG. 5 is a circuit diagram of a system according to the invention for retarding the ignition timing in half the number of combustion chambers of a six-cylinder engine.

FIG. 5 shows an ignition system of a six-cylinder engine as a preferred embodiment of the second aspect of the invention, where the ignition timing for certain cylinders are retarded when the temperature in the thermal reactor 80 falls below a predetermined temperature. In this system, the ignition timing retardation is intended to occur in half the number of the cylinders 1, 2 and 3. A switching device 140 is provided between the three terminals 61, 62 and 63 of the distributor 60 and the three spark plugs 71, 72 and 73, so that the respective terminals 61, 62 and 63 are disconnected from the spark plugs 71, 72 and 73 but connected to separate spark gaps 150, which are located out of the cylinders 1 – 6, when the signal T operates the switching device 140 upon the temperature drop in the thermal reactor 80 below the "trigger temperature". Each spark gap 150 is equipped with a discharge sensor 160, which supplys a signal D to a delayed high voltage pulse generator 170. The three spark plugs 71, 72 and 73 are connected to this pulse generator 170 in parallel with the switching device 140. When each of the terminals 61, 62 and 63 is connected to each of the spark gaps 150, the secondary voltage on the terminal 61, 62 and 63 causes a discharge across the spark gap 150 and the discharge sensor 160 triggers the pulse generator 170. Then the corresponding spark plug 71, 72 or 73 receives a high voltage pulse from the pulse generators 170 with a predetermined time delay from the normal ignition timing. The normal ignition timing is maintained in the remaining cylinders 4, 5 and 6. It will be apparent that the number of the cylinders 1 – 6 subjected to the retardation of the ignition timing is not necessarily limited to three, but may be one, two, four or five and that the cylinders 1 – 6 may be selected arbitrarily in any case.

The retardation of the ignition timing in a limited number of the combustion chambers 1 – 6 has an advantage over the above described intentional misfiring that the temperature in the thermal reactor 80 can be raised by less sacrifices of the engine efficiencies and stability of the engine operation.

Figure 6:
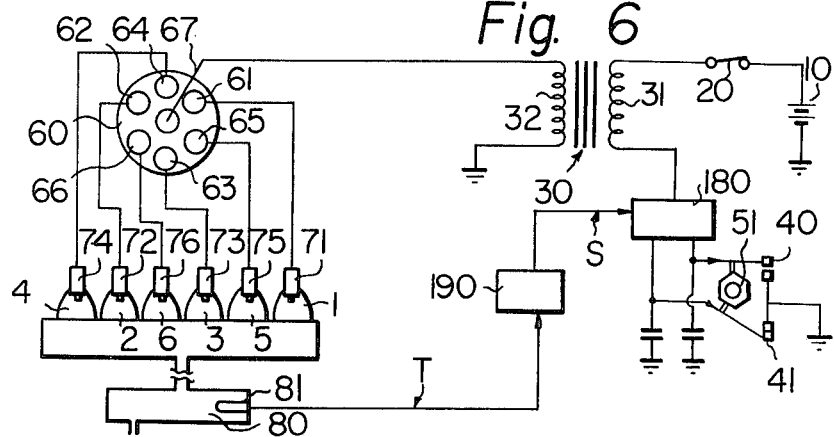
FIG. 6 is a diagram of a fundamental circuit of a system according to the invention for causing all the combustion chambers of a six-cylinder engine to be fired at a retarded ignition timing each intermittently.

The ignition timing retardation according to the invention can be realized also by causing the breaker points 40 to open with a predetermined time delay from the normal timing. In an ignition system of FIG. 6, the primary circuit includes a set of auxiliary breaker points 41 connected in parallel with the normal breaker points 40. Both the sets of breaker points 40 and 41 are governed by a cam 51 which has such a configuration that the auxiliary breaker points 41 are opened with a predetermined time delay after each break of the normal breaker points 40. A high speed electronic switching device 180 is provided in the primary circuit to switch the primary winding 31 of the ignition coil 30 into either of the two sets of breaker points 40 and 41 in response to a signal S from a signal generator 190. The temperature sensor 81 is connected with the signal generator 190, and the signal T governs the function of the signal generator 190. The switching device 180 normally holds the normal breaker points 40 connected to the primary winding 31 so that the secondary voltage can be applied on every spark plug 71 – 76 at the normal ignition timing. When the temperature in the thermal reactor 80 falls below the "trigger temperature", the signal S from the signal generator 190 causes the switching device 180 to switch the primary winding 31 almost instantaneously into the auxiliary breaker points 41 thereby to retard the function timing of the ignition coil 30. The astable multivibrator 100 of FIG. 2 is preferably used as the signal generator 190 so that the signal S may have no relationship with the engine speed and that the ignition timing may be retarded periodically in all the cylinders 1 – 6 indiscriminately and by random turns.

The above detailed description of the preferred embodiments of the invention relates exclusively to a six-cylinder engine, but the number of the combustion chambers is specified only by way of example. A method of the invention can be applicable to all the conventional spark-ignited internal combustion engines having two or more independent combustion chambers. All the combustion chambers of the engine may be fed with a combustible mixture of an air-to-fuel ratio, or alternatively divided into two groups, one fed with a comparatively rich mixture and the other with a lean mixture.

What is claimed is:

1. A method of raising a temperature in a thermal reactor, which reactor communicates with a spark-ignited internal combustion engine having a plurality of combustion chambers for oxidizing carbon monoxide and hydrocarbons in the engine exhaust gas, when the temperature falls below a predetermined temperature, the method comprising the step of retarding the ignition timing of the engine from a normal ignition timing thereof for a portion of total firings in all the combustion chambers during a period of time by connecting a primary winding of an ignition coil in an ignition circuit for the engine alternately and repeatedly to a set of breaker points adjusted to break at a normal timing and a set of auxiliary breaker points adjusted to break with a predetermined time delay from each break of said breaker points at a variable frequency such that a relative amount of time during which the primary winding is connected to the auxiliary breaker points increases as said temperature lowers and when the temperature in the thermal reactor is below the predetermined temperature thereby to raise the temperature of the exhaust gas.

2. A method as claimed in claim 1, wherein said frequency is varied such that said relative amount of time varies within the range from 10 to 50 percent of the sum of said relative amount of time and a relative amount of time during which the primary winding is connected to said breaker points.

3. An ignition system for a spark-ignited internal combustion engine, which engine has a plurality of combustion chambers and is equipped with a thermal reactor for oxidizing carbon monoxide and hydrocarbons in the engine exhaust gas, the system comprising: an ignition coil; a set of breaker points connected to a primary winding of said coil and operative at a normal timing; an ignition distributor connecting a secondary winding of said coil with each of spark plugs of all the combustion chambers by turns to impress a secondary high voltage on each spark plug; a temperature sensor sensing the temperature in the thermal reactor and producing an electric signal representing the sensed temperature; and a set of auxiliary breaker points connectable to said primary winding; a cam means for breaking said auxiliary breaker points with a predetermined time delay from each break of said breaker points; an astable multivibrator which produces a switching signal in the form of a series of pulses in response to said electric signal produced by said sensor when the temperature represented by said electric signal is below a predetermined temperature, the width-to-interval ratio of said pulses increasing as the temperature represented by said electric signal lowers; and an electronic switching means connected to said astable multivibrator for isolating said primary winding from said breaker points and instead connecting said primary winding to said auxiliary breaker points only when each of said pulses is supplied from said astable multivibrator.

* * * * *